Sept. 30, 1958  H. C. HALLDEN  2,854,113
ACTUATOR AND LIMIT MEANS THEREFOR
Filed Feb. 6, 1957  3 Sheets-Sheet 1

INVENTOR.
HOWARD C. HALLDEN
BY
Carlson, Pitzner, Hubbard & Wolf
ATTORNEYS

Sept. 30, 1958 H. C. HALLDEN 2,854,113
ACTUATOR AND LIMIT MEANS THEREFOR
Filed Feb. 6, 1957 3 Sheets-Sheet 2

INVENTOR.
HOWARD C. HALLDEN
BY
Carlson, Pitzner, Hubbard + Wolfe
ATTORNEYS

Sept. 30, 1958 H. C. HALLDEN 2,854,113
ACTUATOR AND LIMIT MEANS THEREFOR
Filed Feb. 6, 1957 3 Sheets-Sheet 3

INVENTOR.
HOWARD C. HALLDEN
BY
ATTORNEYS

United States Patent Office 2,854,113
Patented Sept. 30, 1958

2,854,113

ACTUATOR AND LIMIT MEANS THEREFOR

Howard C. Hallden, Rockford, Ill., assignor to Barber-Colman Company, Rockford, Ill., a corporation of Illinois Application February 6, 1957, Serial No. 638,582

4 Claims. (Cl. 192—141)

The invention relates to power actuators of the type in which an electric motor operates through speed reducing mechanism usually including a screw to move a driven element back and forth through an operating range determined by limit switches.

One object is to incorporate in an actuator of the above character a novel means which operates automatically, in the event of failure of a limit switch, to interrupt the continued application of the actuating force thereby avoiding possible damage to the driven element or its mounting.

A more detailed object is to block a low torque element of the drive train when a switch failure occurs and thereby cause slipping of a drive coupling in the continued operation of the motor.

Another object is to produce the mechanical stopping action in either direction of movement of the driven element.

A further object is to provide a novel construction and mounting of the limit switch actuator so as to adapt the same for convenient adjustment of the operating range from the exterior of the actuator housing.

The invention also resides in the novel manner of sensing failure of a limit switch and deriving the blocking action therefrom.

Other objects and advantages of the invention will become apparent from the following detailed description taken in connection with the accompanying drawings, in which Figure 1 is a longitudinal sectional view through the operating parts of an actuator embodying the novel features of the present invention.

Figure 1:
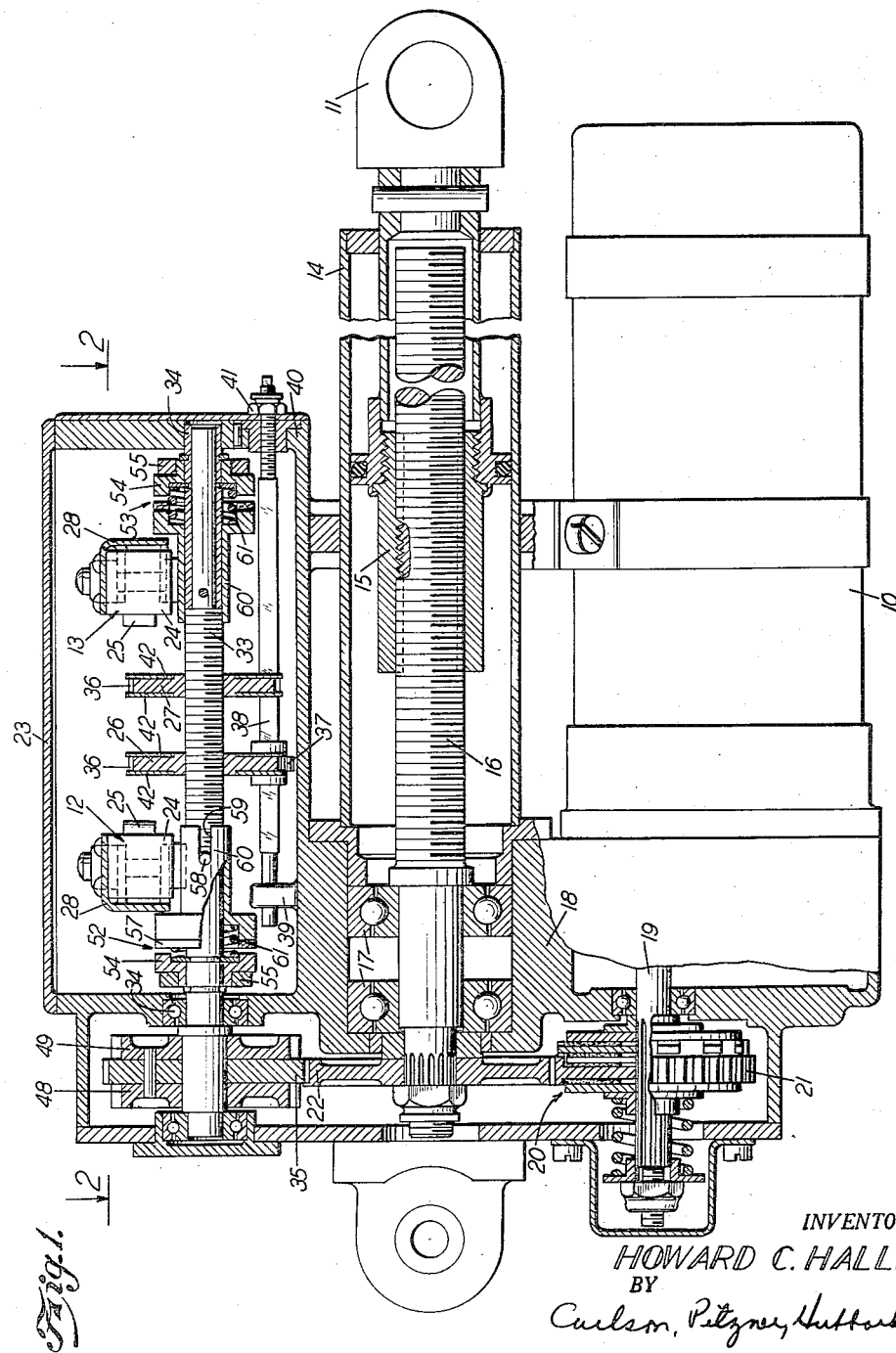

In the drawings, the invention is shown incorporated in a power actuator driven by an electric motor 10 and operable to move a driven element 11 back and forth through a range normally determined by limit switches 12 and 13. Herein the driven element is guided in a tube 14 and at its inner end carries a nut 15 threaded onto a screw 16 which is journaled in bearings 17 in the actuator housing 18. The output shaft 19 of the motor is coupled through a spring loaded friction clutch 20 to a pinion 21 meshing with a gear 22 splined on the screw shaft 16.

The limit switches are disposed within a subhousing 23 with their casings 24 spaced apart and their actuating pins 25 projecting toward each other for engagement by actuating dogs 26 and 27. To permit of some outward yielding of each switch when engaged by its dog, the casings 24 are fixed to arms 28 fulcrumed at 29 and normally urged by springs 30 inwardly against stops 31 formed by the heads of adjustable screws 32.

In the present instance, the switch dogs comprise disk-like nuts threaded onto a screw 33 journaled at 34 in opposite end walls of the housing 23 and keyed to a spur gear 35. The latter meshes with the gear 22 so that the screw 33 turns in opposite directions in unison with the actuator screw 16. Spur teeth 36 formed around the peripheries of the nuts 26 and 27 mesh with pinions 37 splined on shafts 38 which are disposed on opposite sides of the screw 33 and journaled at their inner ends in lugs 39. At their other ends each shaft 38 is threaded and projects through and is journaled in the end wall 40 of the housing 23. By loosening a nut 41 and turning the outer end of the shaft 38, the corresponding nut or switch dog may be turned on the screw 33 and thus adjusted to a new axial position which determines one limit of the range of operation of the driven element 11. Flanges 42 fixed to the peripheries of the disks 26 and 27 straddle the pinions 37 so that the latter slide back and forth along the squared shafts 38 with the disks and thus remain at all times in mesh with the teeth 36 thereon.

In accordance with the present invention, means is provided for sensing failure of either of the limit switches to stop the motor in the normal way at the corresponding limit of travel of the driven element 11 and in response to such failure interpositioning a mechanical stop in the path of a low torque part of the drive train. Herein, this stop comprises one of two pawls 45 and 46 pinned to a rockshaft 47 and engageable one at a time with ratchet wheels 48 and 49 fast on the screw shaft 33 and having teeth 50 facing in opposite directions. Leaf springs 51 normally hold the pawls out of engagement with their respective ratchet wheels.

By applying a torque in either direction to the rockshaft 47, it will be apparent that the corresponding pawl will be moved into engagement with its ratchet and the drive train thus blocked against further turning. Such oppositely directed torques are derived in response to failure of the respective limit switches through the engagement of clutches 52 and 53 responsive to the outward movements of the respective limit switch casings caused by continued operation of the motor due to failure of one or the other of the switches.

Figure 2:
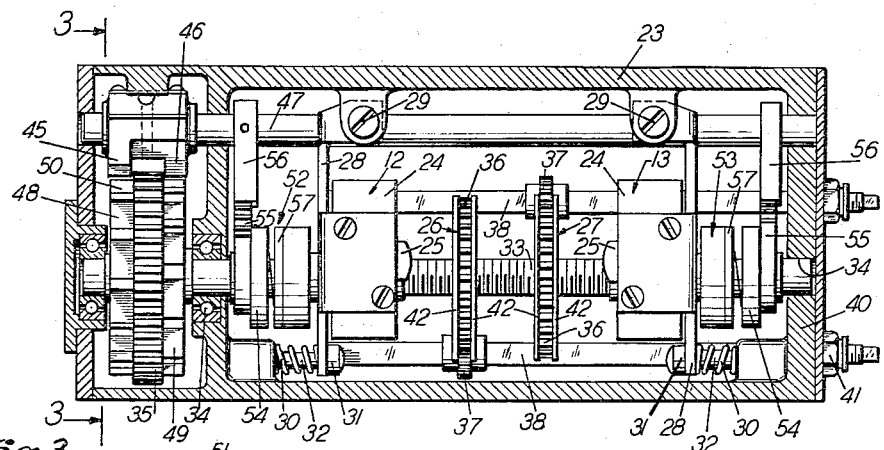
Fig. 2 is a sectional view taken along the line 2—2 of Fig. 1.
Figure 3:
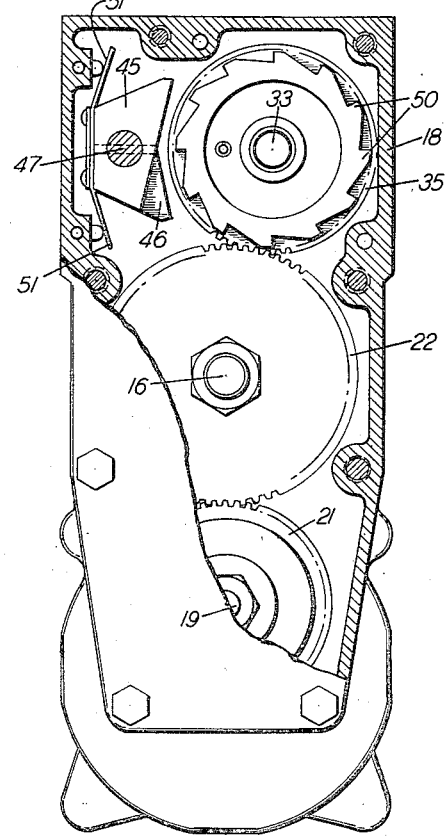
Fig. 3 is a sectional view taken along the line 3—3 of Fig. 2.
Figure 4:
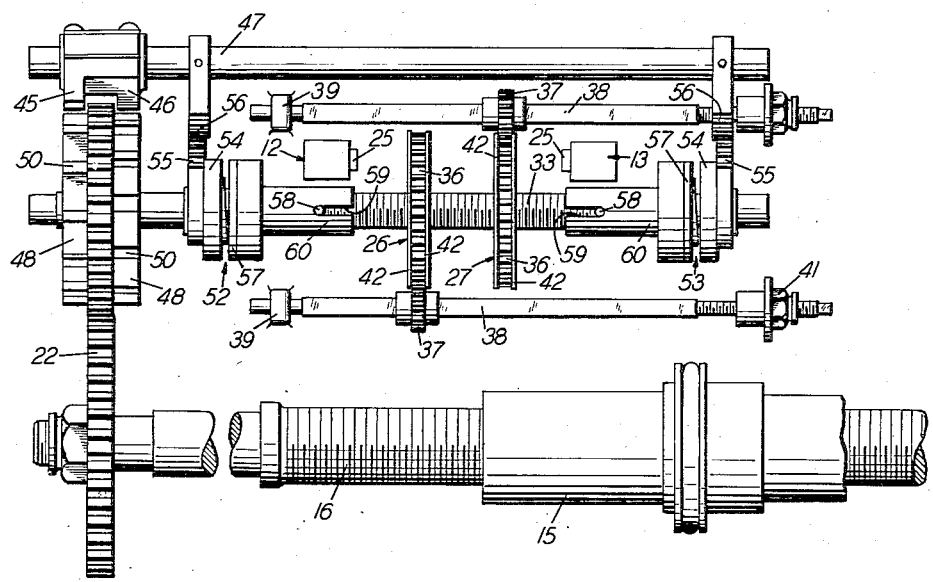
Fig. 4 is a plan view of the operating parts of the switch actuating mechanism.

Preferably each clutch is of the friction type comprising a disk 54 loose on the screw shaft 33 and rigid with a segment 55 which meshes with a gear segment 56 pinned to the rockshaft 47 (Fig. 2). The other element of the clutch comprises a disk 57 spline coupled to the screw shaft 33 by a pin 58 disposed in a slot 59 on a tubular hub 60 slidable along the shaft 33. A compression spring 61 urges the clutch disks apart and normally holds the driving disk 57 in the limit position against the pin 58 in which the mounting arm 28 of the associated switch is disposed inside of but close to the clutch disk so as to be shifted toward the opposed disk upon outward yielding of the switch mounting. By adjusting the initial spacing of the clutch disks and the position of the arm 28, actual engagement of the clutch may be delayed beyond the coasting of the switch arm which normally occurs when the switches operate properly in stopping the motor. In such a case, the clutches will not become engaged at either end of the stroke of the driven element 11 when both of the switches are operating properly.

On the other hand, if either switch fails to stop the motor at the proper time after contact of one of the traveling nuts with its limit switch, the switch arm 28 will be moved outwardly shifting the clutch disk 57 along the shaft 33 into gripping engagement with the driven disk 54. The resulting torque is transmitted to the rockshaft 47 to swing the corresponding one of the pawls 45 or 46 against its ratchet. The latter and the gear 35 are thus blocked against further rotation causing slippage of the main clutch 20 in the continued operation of the motor. In this way, the transmission of the motor torque to the actuated element 11 is interrupted thereby avoiding damaging the actuator, the actuated device, or the mounting for the latter.

By a simple adjustment of the parts to effect earlier engagement of the clutches 52 and 53 in the yielding of the limit switch casings, the mechanical stop mechanism above described may be utilized effectually to cause stopping of the actuated element 11 in precisely defined limit positions. To this end, the screws 32 are adjusted to place the switch mounting arms 28 closer to the clutch element 57 and thus effect gripping engagement of the clutch disks within the normal coasting time of the motor. In such a case, one clutch is always engaged at the end of the corresponding stroke of the driven element 11 thus rendering the corresponding pawl effective to block the gear 35 in a precise position, continued coasting of the motor to a stop being permitted by slipping of the main clutch 20.

I claim as my invention:

1. A power actuator for moving a driven element toward and away from a limit position having, in combination, two shafts geared together to turn in unison, one of said shafts being a screw, a reversible electric motor, a slip coupling between said motor and said shafts, a dog threaded onto said screw shaft so as to travel back and forth along the latter during turning thereof in opposite directions, a limit switch positioned for engagement by said dog in the approach of said element to said limit position, a ratchet wheel rotatable with said shafts and having teeth facing in one direction, a stationary support, a pawl mounted on said support for movement into and out of the path of the teeth of said ratchet to block the latter and said shafts against turning or to release the ratchet and said shafts, a clutch adapted when engaged to cause said screw shaft to move said pawl into blocking position, and means actuated in the final movement of said dog and during coasting of said motor to engage said clutch.

2. A power actuator for moving a driven element toward and away from a limit position having, in combination, two shafts geared together to turn in unison, one of said shafts being a screw and the other being coupled to said driven element, a reversible electric motor, a slip coupling between said motor and said shafts, a dog threaded onto said screw shaft so as to travel back and forth along the latter during turning thereof in opposite directions, a limit switch positioned for engagement by said dog in the approach of said element to said limit position, a toothed member rotatable with said shafts, a stationary support, a pawl mounted on said support for movement into and out of the path of the teeth of said member to block the latter against turning or to release the member, a clutch adapted when engaged to cause said screw shaft to move said pawl into blocking position, and means actuated in the movement of said dog after engagement of said switch to engage said clutch.

3. The combination of, a motor driven actuator for moving a driven element back and forth through a predetermined range, a housing for said actuator, a screw shaft within said housing rotatable in unison with the movement of said element, a limit switch, a nut threaded onto said shaft and engageable with said switch to stop said actuator with said element at one end of said range, gear teeth formed around the outer periphery of said nut, a rotary shaft disposed alongside said screw shaft and projecting outwardly through a wall of said housing, a pinion splined on said shaft and meshing with said teeth to provide for axial adjustment of the nut along the screw by turning of said shaft, means on said housing detachably holding said shaft against turning, and means for holding said pinion and nut in a common plane while permitting rotation and axial shifting of the two in unison.

4. The combination of, a motor driven actuator for moving a driven element back and forth through a predetermined range, a housing for said actuator, a screw within said housing rotatable in unison with the movement of said element, a limit switch, a nut threaded onto said screw and engageable with said switch to stop said actuator with said element at one end of said range, teeth formed around the outer periphery of said nut to constitute the latter a gear, a rotary shaft disposed alongside said screw and projecting outwardly through a wall of said housing, a pinion gear splined on said shaft and meshing with said teeth to provide for axial adjustment of the nut along the screw by turning of said shaft, means on said housing detachably holding said shaft against turning, and flanges fixed to one of said gears and straddling the other gear to hold the two in mesh during axial movement of said nut.

References Cited in the file of this patent

UNITED STATES PATENTS

| 2,482,568 | Werner | Sept. 20, 1949 |
| 2,531,109 | Chapman | Nov. 21, 1950 |

FOREIGN PATENTS

| 13,237 | Great Britain | 1894 |
| 70,435 | Austria | June 15, 1915 |